(12) United States Patent
Kim et al.

(10) Patent No.: US 8,300,598 B2
(45) Date of Patent: Oct. 30, 2012

(54) HANDOVER METHOD IN MOBILE NETWORK, MOBILE TERMINAL AND MOBILE NETWORK SYSTEM THEREOF

(75) Inventors: Kyung Sook Kim, Daejeon (KR); Gyung Chul Sihn, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 665 days.

(21) Appl. No.: 12/212,338

(22) Filed: Sep. 17, 2008

(65) Prior Publication Data

US 2009/0156219 A1 Jun. 18, 2009

(30) Foreign Application Priority Data

Dec. 13, 2007 (KR) .................. 10-2007-0130344

(51) Int. Cl.
*H04W 4/00* (2009.01)
(52) U.S. Cl. ........ 370/331; 370/328; 370/329; 370/330; 370/332; 370/333; 455/436; 455/437; 455/438; 455/439; 455/440; 455/441; 455/442; 455/443; 455/444; 455/509
(58) Field of Classification Search .................. 455/451, 455/452.1, 453, 436–444, 450–452.2, 509; 370/252, 254, 334, 395.2, 395.21, 401, 328–333; 709/227–229
See application file for complete search history.

(56) References Cited

U.S. PATENT DOCUMENTS

| | | | |
|---|---|---|---|
| 6,965,605 B1 * | 11/2005 | Amos et al. ................... 370/401 |
| 7,092,719 B2 * | 8/2006 | Khan ........................ 455/452.2 |
| 7,096,022 B2 * | 8/2006 | Gao et al. ....................... 455/444 |
| 7,130,639 B2 * | 10/2006 | Lee et al. .................... 455/452.2 |
| 7,394,789 B2 * | 7/2008 | Sakawa et al. ................ 370/331 |
| 7,729,308 B2 * | 6/2010 | Taneja .......................... 370/329 |
| 7,769,384 B2 * | 8/2010 | Lee et al. ...................... 455/436 |
| 2004/0082363 A1 * | 4/2004 | Hosein .......................... 455/560 |
| 2004/0121778 A1 * | 6/2004 | Hunkeler et al. .......... 455/452.2 |
| 2008/0002612 A1 * | 1/2008 | Haumont ...................... 370/328 |
| 2009/0005047 A1 * | 1/2009 | Gupta et al. .................. 455/437 |

FOREIGN PATENT DOCUMENTS

| | | |
|---|---|---|
| KR | 10-2006-0027761 | 3/2006 |
| KR | 10-2007-0006539 | 1/2007 |

OTHER PUBLICATIONS

Korean Notice of Allowance dated Apr. 30, 2010 and issued in corresponding Korean Patent Application 10-2007-0130344.

* cited by examiner

*Primary Examiner* — Olumide T Ajibade Akonai
(74) *Attorney, Agent, or Firm* — Fenwick & West LLP

(57) ABSTRACT

A method of performing handover in a mobile communication network, a mobile communication terminal using the same, and a mobile network system are provided. The method of performing handover in a mobile communication network includes: receiving QoS requirement on a mobile service basis from a user terminal; determining a most suitable mobile network to QoS requirement of a mobile service as a network for handover; and requesting handover to a base station of a mobile network determined as a network for handover. Therefore, in consideration of characteristics of a mobile network and a quality of a service used by a user, by determining handover to an optimum mobile network on a service quality basis, service interruption due to performing unnecessary handover can be prevented and by effectively distributing traffic of a mobile network, overload of a system can be prevented.

16 Claims, 5 Drawing Sheets

HANDOVER METHOD IN MOBILE NETWORK, MOBILE TERMINAL AND MOBILE NETWORK SYSTEM THEREOF

CROSS-REFERENCE TO RELATED APPLICATIONS

This application is based upon and claims the benefit of priority from prior Korean Patent Application No. 10-2007-0130344 filed on Dec. 2007, the entire contents of which are incorporated herein by reference.

BACKGROUND OF THE INVENTION

1. Field of the Invention

The present invention relates to a method of performing handover in a mobile communication network in which a mobile communication terminal positioned at a region in which two or more mobile communication networks are overlapped selects an optimum network service and provides the optimum network service to a user.

The present invention was supported by the IT R&D program of Ministry of Information and Communication(MIC) and Institute for Information Technology Advancement (IITA) [Project No.: 2006-S-003-02, Project Title: Research on service platform for the next generation mobile comm].

2. Description of the Related Art

Nowadays, a mobile communication network has an overlay network structure having an overlapped service area due to mixing of a mobile access network for high speed data transmission, an existing wide-area cellular mobile access network, and a local area mobile access network.

In an overlay mobile communication network environment, in order to provide a ceaseless service to a user in an optimum network regardless of a user position, it is necessary to determine an optimum network among overlapped mobile communication networks and support handover for connecting to the optimum network.

SUMMARY OF THE INVENTION

The present invention has been made in an effort to solve the above problems, and the present invention provides a method of performing handover, a mobile communication terminal using the same, and a mobile network system that can provide an optimum mobile network for a QoS requirement of mobile services provided on a mobile network.

According to an aspect of the present invention, there is provided a method of performing handover in a mobile communication network including: receiving QoS requirement per a mobile service, which is information about a QoS requested to each of a plurality of mobile services from a user terminal; determining a most suitable mobile network to QoS requirement of the mobile service among mobile networks to which the user terminal can be connected as a network for handover with respect to each of a plurality of mobile services; and requesting handover to a base station that provides a mobile network determined as a network for handover with respect to a first mobile service determined to handover among the plurality of mobile services.

According to another aspect of the present invention, there is provided a mobile communication terminal including: a signal intensity detection unit that detects reception signal intensity of a plurality of mobile networks; a transmission unit that transmits QoS requirement per a mobile service, which is information about quality requested to each of the plurality of mobile services and information about the detected reception signal intensity of the plurality of mobile networks to a currently connected first base station; and a reception unit that receives an instruction for performing handover of a first mobile service among the plurality of mobile services to a second base station from the first base station, wherein a mobile network provided by the second base station is selected based on QoS requirement of the first mobile service.

According to another aspect of the present invention, there is provided a mobile network system including: a reception unit that receives information about reception signal intensity of a plurality of mobile networks and QoS requirement on a mobile service basis, which is information about quality requested to each of a plurality of mobile services from a user terminal; a first handover determination unit that determines connectable mobile networks among the plurality of mobile networks using information about the reception signal intensity; and a second handover determination unit that determines a most suitable mobile network to QoS requirement of a mobile service among mobile networks to which the user terminal can be connected as a network for handover with respect to each of the plurality of mobile services.

According to another aspect of the present invention, there is provided a computer readable recording medium on which a program for executing the method in a computer is recorded.

DETAILED DESCRIPTION OF THE PREFERRED EMBODIMENT

A method of performing handover in a mobile communication network, a mobile communication terminal using the same, and a mobile communication system according to an exemplary embodiment of the present invention will be described in detail hereinafter with reference to FIGS. 1 to 6.

Figure 1:
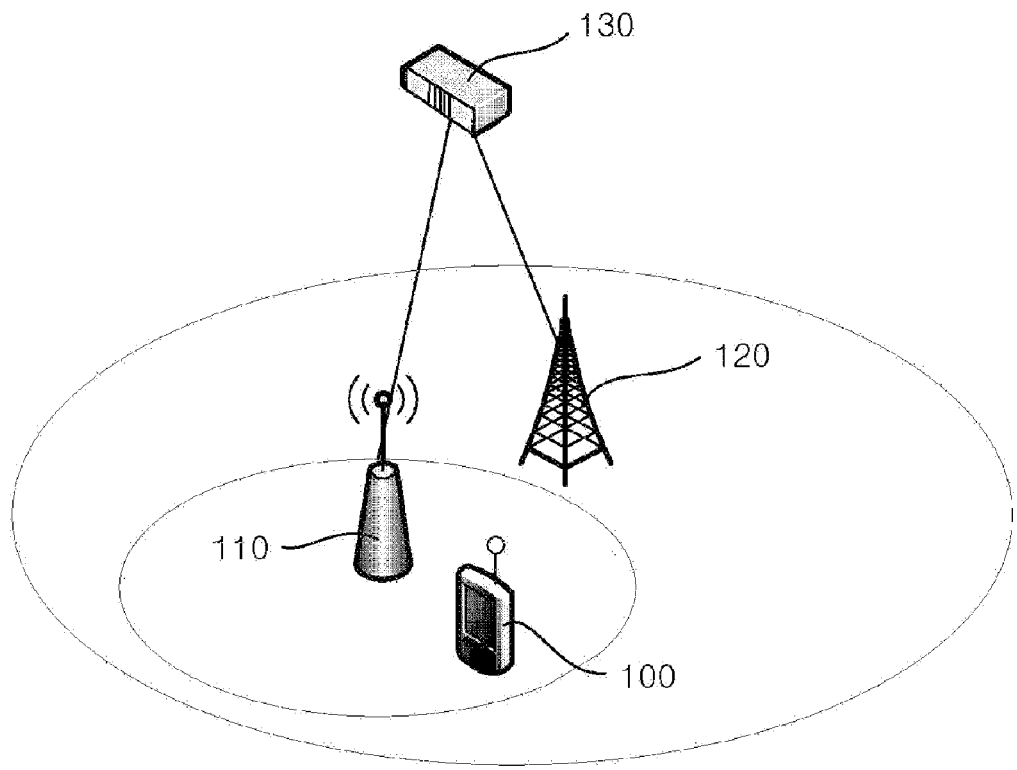
FIG. 1 is a diagram illustrating an exemplary embodiment of a configuration in which a plurality of mobile networks are overlapped.

FIG. 1 is a diagram illustrating an exemplary embodiment of a configuration in which a plurality of mobile networks are overlapped.

Referring to FIG. 1, according to a position of a mobile network base station, a plurality of mobile networks may be overlapped. That is, a plurality of mobile networks to which different mobile network technology is applied, for example, a mobile communication network for high speed data transmission, a wide-area cellular network, a local area mobile network (WLAN) may be overlapped in an area at which a mobile communication terminal 100 is positioned.

For example, as shown in FIG. 1, two base stations 110 and 120 for providing RAT1 and RAT2, respectively, which are mobile network technology having different characteristics are positioned and thus the mobile communication terminal 100 for supporting an interface for the RAT1 and RAT2 can be connected to a mobile network RAT1 and a mobile network RAT2.

A gateway 130 performs a function of allocating an Internet protocol (IP) address of the mobile communication terminal 100 and connecting an IP backbone network.

Referring to FIG. 1, a mobile network system according to an exemplary embodiment of the present invention is described in detail.

In order to transfer data of a using mobile service, the mobile communication terminal 100 manages radio bearer (RB) between the mobile communication terminal 100 and the base stations 110 and 120, which are mobile access systems and manages radio bearer informations of various mobile service quality and a service quality profile (QoS profile) of each radio bearer.

In order to transmit data of a mobile service while using in the mobile communication terminal 100, the base stations 110 and 120, which are mobile access systems manage RB of the mobile communication terminal 100 and access bearer (AB) of the gateway 130. Further, the base stations 110 and 120 manage RB information of various mobile service qualities and a QoS profile of each RB and manage data path for a mobile service of the mobile communication terminal 100 through mapping information between each RB and AB.

The gateway 130 manages AB between the gateway 130 and the base stations 110 and 120 in order to transmit data of a mobile service while using in the mobile communication terminal 100 and manages AB information of various mobile service quality and a QoS profile of each AB.

Figure 2:
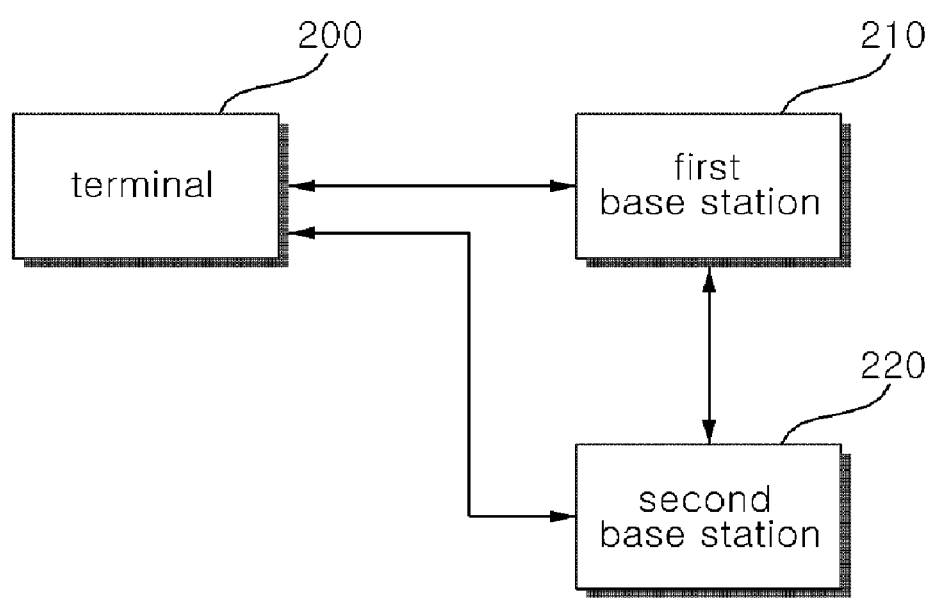
FIG. 2 is a block diagram illustrating a configuration of a network system according to an exemplary embodiment of the present invention.

FIG. 2 is a block diagram illustrating a configuration of a network system according to an exemplary embodiment of the present invention, and a method of performing handover in a mobile communication network according to an exemplary embodiment of the present invention is described with reference to FIGS. 1 and 2.

Referring to FIG. 2, as a user moves, a mobile network to which a mobile communication terminal 200 can be connected and reception signal intensity of cells belonging to the mobile network may be changed.

In FIG. 1, two mobile networks are overlapped in an area at which the mobile communication terminal 200 is positioned, however in a method of performing handover according to an exemplary embodiment of the present invention, mobile networks that support three or more different mobile network technology may be overlapped.

FIG. 2 is a block diagram illustrating a configuration of a network system according to an exemplary embodiment of the present invention.

Referring to FIG. 2, a first base station 210, which is a mobile access system that provides a mobile network to which the terminal 200 is currently connected requests measurement for a QoS requirement of each of mobile services and measurement for reception signal intensity of a plurality of mobile networks to the terminal 200.

The terminal 200 measures a QoS requirement of applications on a mobile service basis and transmits QoS requirement on a mobile service basis to the first base station 210.

Further, the terminal 200 measures reception signal intensity of each of a plurality of mobile networks overlapped in a current position area and transmits signal intensity information on a mobile network basis to the first base station 210.

The first base station 210 can determine an optimum mobile network for each of a plurality of mobile services as a mobile network for handover using QoS requirement of the transmitted mobile service and signal intensity information on a mobile network basis.

For example, the mobile network for handover is a mobile network in which reception signal intensity is more than predefined threshold value and may be a mobile network that can provide a quality most similar to a service quality requested by a mobile service.

Further, when the terminal 200 may use the N quantity of mobile services, the first base station 210 can determine a mobile network for handover of the N quantity of mobile services by determining a mobile network for handover with respect to each of the N quantity of mobile services.

For example, when the terminal 200 may use a first service and a second service, the first base station 210 can determine a most suitable mobile network to a quality request for a first service among a plurality of mobile networks as a first mobile network for handover for providing the first service and a most suitable mobile network to a quality request for a second service among a plurality of mobile networks as a second mobile network for handover for providing the second service.

When a mobile network for handover on a mobile service basis determined by the above-described method is different from a mobile network currently connected in order to provide the corresponding service, a currently connected first base station 210 requests handover to a base station that provides the mobile network for handover.

For example, when both the first and second services are provided using the first base station 210, a network for handover of the first service is identical to a currently connected network, and a network for handover of the second service is a mobile network provided by the second base station 220, the first base station requests handover for the second service to the second base station 220.

As described above, by a method of performing handover according to the present invention, a plurality of mobile services that can be used by the terminal 200 can be provided using a different mobile network. That is, a part of the plurality of mobile services may be provided by a mobile network of the first base station 210 and another part thereof may be provided by a mobile network of the second base station 220.

Figure 3:
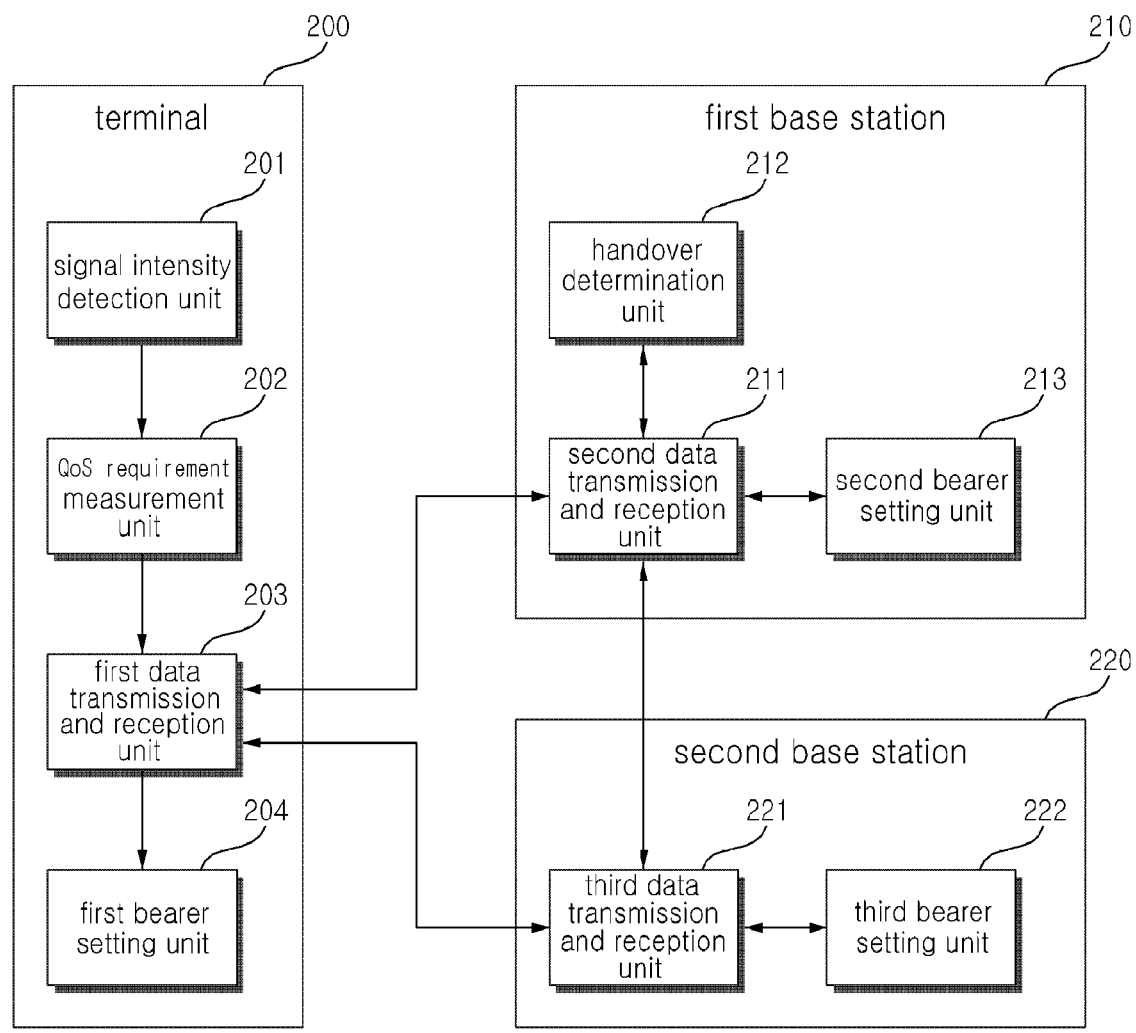
FIG. 3 is a block diagram illustrating a configuration of a mobile communication terminal and a mobile network system according to an exemplary embodiment of the present invention.

FIG. 3 is a block diagram illustrating a configuration of a mobile communication terminal and a mobile network system according to an exemplary embodiment of the present invention.

Figure 4:
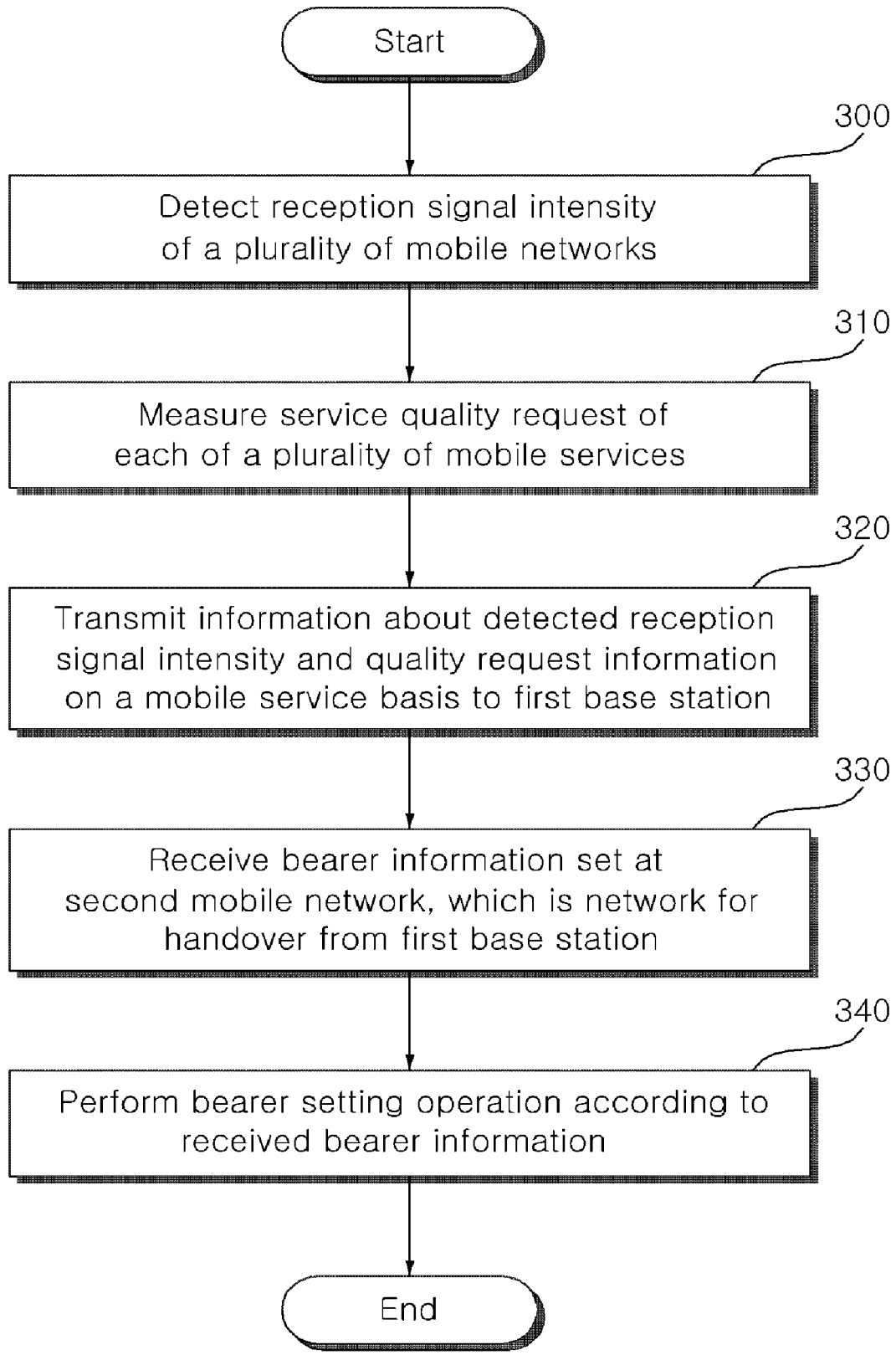
FIG. 4 is a flowchart illustrating a first exemplary embodiment of a method of performing handover in a mobile communication network according to the present invention.

An operation of the terminal 200 according to an exemplary embodiment of the present invention shown in FIG. 3 is described using a flowchart illustrating a first exemplary embodiment of a method of performing handover in a mobile communication network according to the present invention shown in FIG. 4.

Referring to FIG. 3, the terminal 200 may include a signal intensity detection unit 201, a QoS requirement measurement unit 202, a first data transmission and reception unit 203, and a first bearer setting unit 204.

The signal intensity detection unit 201 detects reception signal intensity of each of a plurality of mobile networks (S300).

The QoS requirement measurement unit 202 measures a QoS requirement of each of a plurality of mobile services that can be used by the terminal 200 (S310).

The reception signal intensity detection step (S300) and the QoS requirement measurement step (S310) can be performed when a request from the currently connected first base station 210 exists. Further, the terminal 200 may perform step 300 or step 310 in every preset period.

The signal intensity detection unit 201 activates a modem for connecting the corresponding mobile network at step 300 and inactivates the connected modem after step 300, thereby reducing power consumption.

The first data transmission and reception unit 203 transmits QoS requirement on a mobile service basis having information about the measured QoS requirement and signal intensity information on a mobile network basis having information about the detected reception signal intensity to the first base station 210.

The first base station 210 determines a mobile network for handover of each of the plurality of mobile services using signal intensity information on a mobile network basis and QoS requirement on a mobile service basis.

The first data transmission and reception unit 203 receives bearer information that is set to the mobile network for handover from the first base station 210 (S330).

For example, when a mobile network provided by the second base station 220 is determined as a network for handover of the first mobile service, in order to provide the first mobile service, the first base station 210 can transmit bearer information that is set at the second base station 220 to the terminal 200.

The first bearer setting unit 204 performs a bearer setting operation for the first mobile service according to the received bearer information (S340).

Figure 5:
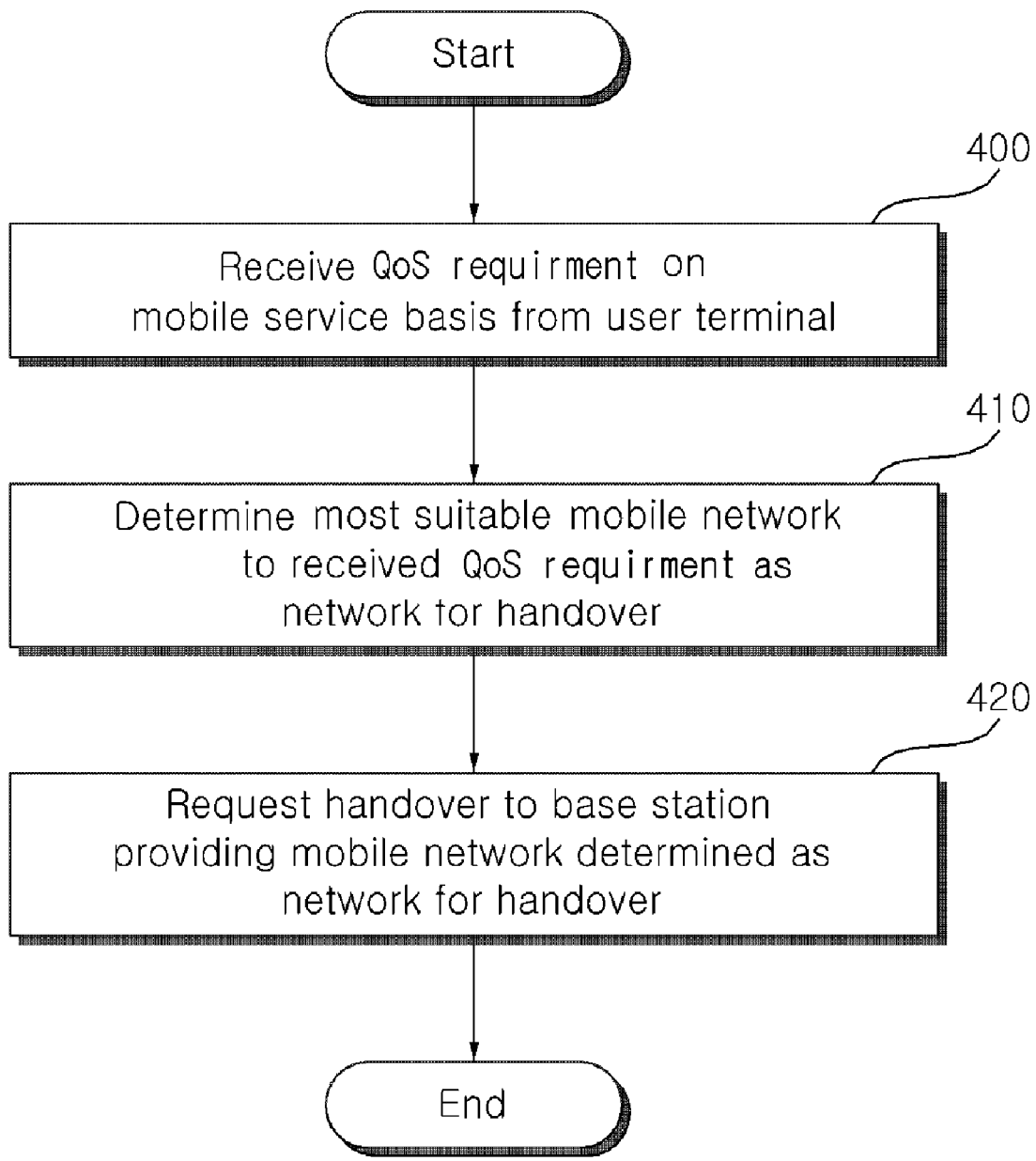
FIG. 5 is a flowchart illustrating a second exemplary embodiment of a method of performing handover in a mobile communication network according to the present invention.

An operation of a mobile network system according to an exemplary embodiment of the present invention shown in FIG. 3 is described using a flowchart illustrating a second exemplary embodiment of a method of performing handover in a mobile communication network according to the present invention shown in FIG. 5.

Referring to FIG. 3, the first base station 210 to which the terminal 200 is currently connected may include a handover determination unit 211, a second data transmission and reception unit 212, and a second bearer setting unit 213.

The second data transmission and reception unit 212 receives QoS requirement on a mobile service basis from the terminal 200 (S400).

The handover determination unit 212 determines an optimum mobile network for each of a plurality of mobile services as a mobile network for handover using the received QoS requirement on a mobile service basis (S410).

As described above, the second data transmission and reception unit 212 receives signal intensity information on a mobile network basis from the terminal 200 and determines a mobile network for handover of each of a plurality of mobile services in comprehensive consideration of the signal intensity information on a mobile network basis and the QoS requirement on a mobile service basis.

The second data transmission and reception unit 212 requests to perform handover to a base station for providing a mobile network for handover determined at step 410 (S420).

The second bearer setting unit 213 performs a resetting operation of bearer according to the requested handover.

For example, when a mobile network provided by the second base station 220 is determined as a network for handover of the first mobile service, the second data transmission and reception unit 212 can request handover of the first mobile service to the second base station 220.

When a third data transmission and reception unit 221 receives a request for handover of the first mobile service, a third bearer setting unit 222 performs a bearer setting operation for providing the first mobile service.

Figure 6:
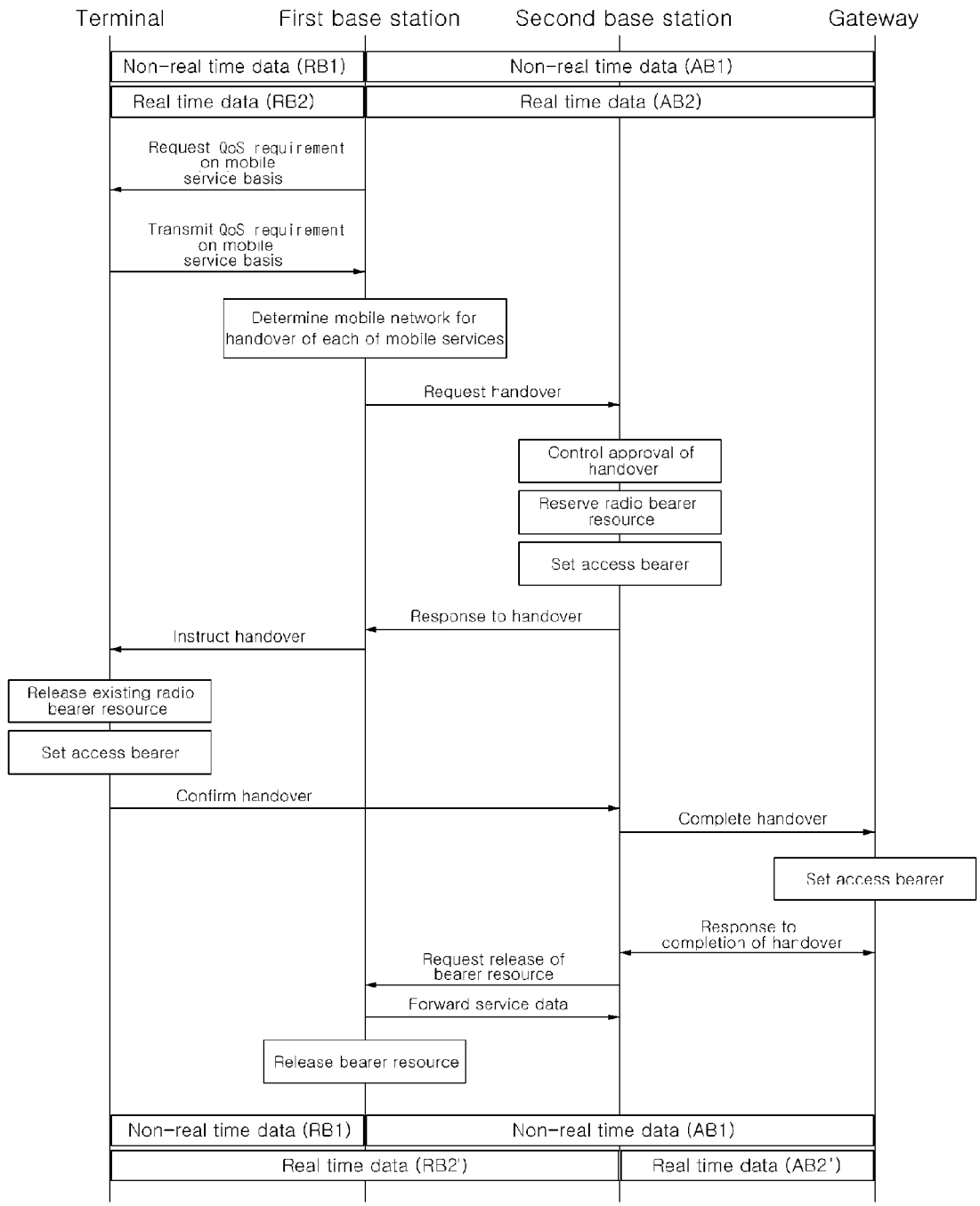
FIG. 6 is a flowchart illustrating a third exemplary embodiment of a method of performing handover in a mobile communication network according to the present invention.

FIG. 6 is a flowchart illustrating a third exemplary embodiment of a method of performing handover in a mobile communication network according to the present invention.

Referring to FIG. 6, the terminal supports a first mobile network RAT1 for providing high speed mobility and a second mobile network RAT2 for performing high speed data transmission when moving in a low speed and is connected to the first base station 210 that currently supports the first mobile network RAT1 to receive a mobile service.

Further, it is assumed that a non-real time data transmission service among a plurality of mobile services includes a first radio bearer (RB1) between the terminal and the first base station and a first access bearer (AB1) between the first base station and a gateway, and a real time data transmission service includes a second radio bearer (RB2) between the terminal and the first base station and a second access bearer (AB2) between the first base station and the gateway.

The first base station requests QoS requirement on a mobile service basis to the terminal (201), and the terminal measures a QoS requirement of an application that receives a service using each of the first and second radio bearers RB1 and RB2 and reports the measured value to the first base station.

The first base station determines an optimum mobile network for a non-real time data transmission service as a network for first handover target according to the transmitted QoS requirement on a mobile service basis and determines an optimum mobile network for the real time data transmission service as a network for second handover target.

For example, when a mobile network RAT2 provided by the second base station is determined as a target network for handover of a real time data transmission service, the first base station requests handover of a real time data transmission service to the second base station.

The handover request includes information about the second radio bearer RB2 and information about the second access bearer AB2, which is a path in which a real time data transmission service to perform handover previously uses, and a quality profile of the real time data transmission service.

The second base station controls approval based on a service quality profile included in the handover request from the first base station, and when a request for handover is approved, the second base station reserves a new second radio bearer RB2' resource for the real time data transmission service based on a service quality profile and the second radio bearer RB2 included in the handover request.

The second base station sets a new second access bearer AB2' for the real time data transmission service based on a service quality profile and the second access bearer AB2 included in the handover request.

When reservation of the second radio bearer RB2' resource and setting of the second access bearer AB2' are completed, the second base station transmits a response of handover to the first base station.

The response of handover includes information about a new second radio bearer RB2' for the real time data transmission service for requesting handover.

The first base station instructs handover to the terminal based on the handover response from second base station. The handover instruction includes information about the second radio bearer RB2 used by the real time data transmission service and information about a new second radio bearer RB2' reserved by the second base station through the first base station.

The terminal releases the conventionally used second radio bearer RB2 resource by connecting to the first base station through a mobile network RAT1 provided by the first base station and sets a second radio bearer RB2' for connecting to the second base station using a new second radio bearer RB2' information included in the handover instruction.

When setting of the new second radio bearer RB2' is completed, the terminal transmits handover confirmation to the second base station. The handover confirmation includes information about the second radio bearer RB2' whose setting is completed in the terminal.

After confirming that setting of the new second radio bearer RB2' is completed by a handover confirmation message, the second base station transmits completion of the handover to the gateway. The completion of handover may include information about the previous second access bearer AB2 used by the first base station and information about the second access bearer AB2' newly set by the second base station.

After receiving the completion of handover, the gateway sets the second access bearer AB2' for the real time data transmission service, changes a real time service data path to a new second access bearer AB2', and allows the real time service data to transfer to the second base station.

When the path change is completed, the gateway transmits a response of completion of handover to the second base station. The response of completion of handover may include information about the new second access bearer AB2' that is set at the gateway.

When the second base station receives a completion response of the handover, the second base station requests release of a bearer resource to the first base station. The request for resource release may include information about a second radio bearer RB2 and information about the second access bearer AB2 in which the real time data transmission service has used.

The first base station forwards buffered real time service data related to the real time data transmission service to the second base station and releases the second access bearer AB2 resource and the second radio bearer RB2 resource that are previsouly used for the real time data transmission service.

When a radio bearer does not exist between the first base station and the terminal by the release of the bearer resource, a mobile connection resource between the first base station and the terminal may be also released.

In such a method of performing handover according to an exemplary embodiment of the present invention, in consideration of characteristics of mobile networks that support different mobile network technology and various quality requests of a mobile service used by the user, by performing handover on a service quality basis, a non-real time data transmission service does not perform unnecessary handover and uses a currently connected mobile network RAT1, and a real time data transmission service can perform handover to a mobile network RAT2 that provides a high speed data transmission service.

Accordingly, by using a new path consisting of a new second radio bearer RB2' between the terminal and the second base station and a new second access bearer AB2' between the second base station and the gateway, the user can use a high speed of real time data transmission service.

In another embodiment according to the present invention, when a user terminal uses a large capacity of FTP service while using a voice service, if a mobile network for providing a high speed data transmission service can be used, a voice service is received through a currently connected mobile network that provides high speed mobility and the FTP service can perform handover to a mobile network for providing a high speed data transmission service.

Accordingly, in the voice service, because unnecessary handover is not performed, service interruption does not occur, and because a load of the FTP service is distributed, a better quality service can be provided.

According to a method of performing handover of the present invention, in consideration of characteristics of a mobile network and a quality of a service used by a user, by determining handover to an optimum mobile network on a service quality basis, service interruption due to performing unnecessary handover can be prevented and by effectively distributing traffic of a mobile network, overload of a system can be prevented.

The present invention may be also implemented with computer readable codes in a computer readable recording medium. The computer readable recording medium may include all kinds of recording devices in which data that can be read by a computer system are stored. The computer readable recording medium may include, for example a ROM, a RAM, a CD-ROM, a magnetic tape, a floppy disk, and an optical data storage device. In addition, the computer readable recording medium may also include implementations in the form of carrier waves (e.g. transmission via Internet). Further, the computer readable recording medium is distributed to a computer system connected to a network and the computer readable codes may be stored and executed therein in a distributed manner.

The embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of performing handover in a mobile communication network, comprising:
receiving a quality of service (QoS) requirement for each of a plurality of mobile services associated with a user terminal, the QoS requirement representing information about quality requested for a corresponding mobile service, wherein at least two of the plurality of mobile services have different QoS requirements;
determining a suitable mobile network for each of the mobile services based on a corresponding QoS requirement to perform a handover operation for each mobile service; and
requesting a handover operation of a first mobile service of the plurality of mobile services to a base station associated with a mobile network suitable for the first mobile service but not requesting a handover operation of a second mobile service of the plurality of mobile services to the base station based on the determination.

2. The method of claim 1, wherein reception signal intensity of the connectable mobile networks is more than predefined threshold value.

3. The method of claim 1, wherein the determining of one of mobile networks comprises determining a mobile network that provides quality most similar to QoS requested to a mobile network among mobile networks to which the user terminal can be connected as a network for handover.

4. The method of claim 1, wherein the requesting of handover comprises transmitting bearer information and a quality profile that are currently set to the first mobile service to the base station.

5. The method of claim 1, further comprising receiving first bearer information set to the base station from the base station in order to provide the first mobile service.

6. The method of claim 5, further comprising transmitting the received first bearer information and second bearer information currently set to the first mobile service to the user terminal.

7. The method of claim 1, further comprising releasing a bearer resource for providing the first mobile service after handover of the first mobile service is completed.

8. The method of claim 7, further comprising transmitting buffered service data related to the first mobile service to the base station after handover to the base station is completed.

9. A mobile communication terminal comprising:
- a signal intensity detection unit configured to detect reception signal intensity of a plurality of mobile networks;
- a transmission unit configured to transmit a quality of service (QoS) requirement for each of a plurality of mobile services associated with the mobile communication terminal the QoS requirement indicating information about quality requested for a corresponding mobile service, wherein at least two of the plurality of mobile services have different QoS requirements; and
- a reception unit configured to receive an instruction for performing handover of a first mobile service to a base station but not handover a second mobile service among the plurality of mobile services to the base station,
- wherein a mobile network provided by the second base station is selected based on first QoS requirement of the first mobile service and second QoS requirement of the second mobile service.

10. The mobile communication terminal of claim 9, wherein the reception signal intensity of the plurality of mobile networks or a quality requested to the plurality of mobile services is detected in every predetermined period.

11. The mobile communication terminal of claim 9, wherein the reception unit receives bearer information set at the second base station from the first base station in order to provide the first mobile service.

12. The mobile communication terminal of claim 11, further comprising a bearer setting unit that performs bearer setting for providing the first mobile service using the received bearer information.

13. The mobile communication terminal of claim 12, wherein the bearer setting unit releases a currently configured bearer resource in order to provide the first mobile service after receiving bearer information from the first base station.

14. A mobile network system comprising:
- a reception unit configured to receive information about reception signal intensity of a plurality of mobile networks and a quality of service (QoS) requirement for each of a plurality of mobile services provided on a user terminal, the QoS requirement representing information about requested quality for a corresponding mobile service;
- a first handover determination unit configured to determine connectable mobile networks among the plurality of mobile networks using information about reception signal intensity; and
- a second handover determination unit configured to determine, for each of the plurality of mobile services, one of mobile networks to which the user terminal can be connected for handover using QoS requirement of each of the plurality of mobile services, wherein a first mobile service of the plurality of mobile services is handed over to a base station based on QoS requirement of the first mobile service but a second mobile service of the plurality of the mobile services is not handed over to the network based on QoS requirement of the second mobile service.

15. The mobile network system of claim 14, further comprising a transmission unit that transmits bearer information and a quality profile that are currently set to the first mobile service among the plurality of mobile services to a base station for providing a mobile network determined as a network for handover.

16. The mobile network system of claim 15, wherein the transmission unit transmits bearer information that is set to the base station to the user terminal in order to provide the first mobile service.

* * * * *